Jan. 29, 1957   H. I. MYER ET AL   2,779,309
DAIRY STABLE SANITATION EQUIPMENT
Filed Oct. 12, 1954
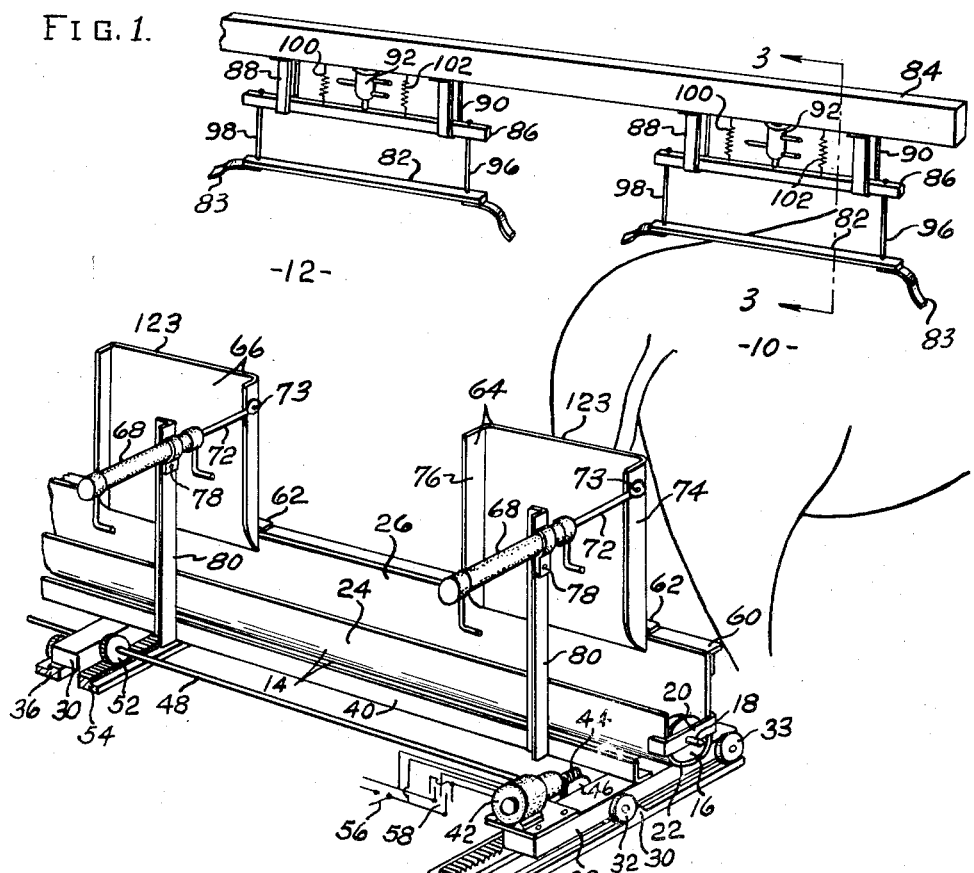
FIG. 1.
FIG. 3.
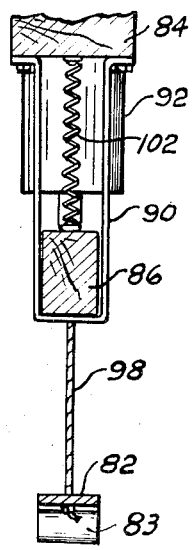
INVENTORS
FRED C. MYER
HOWARD I. MYER
BY
ATTORNEY

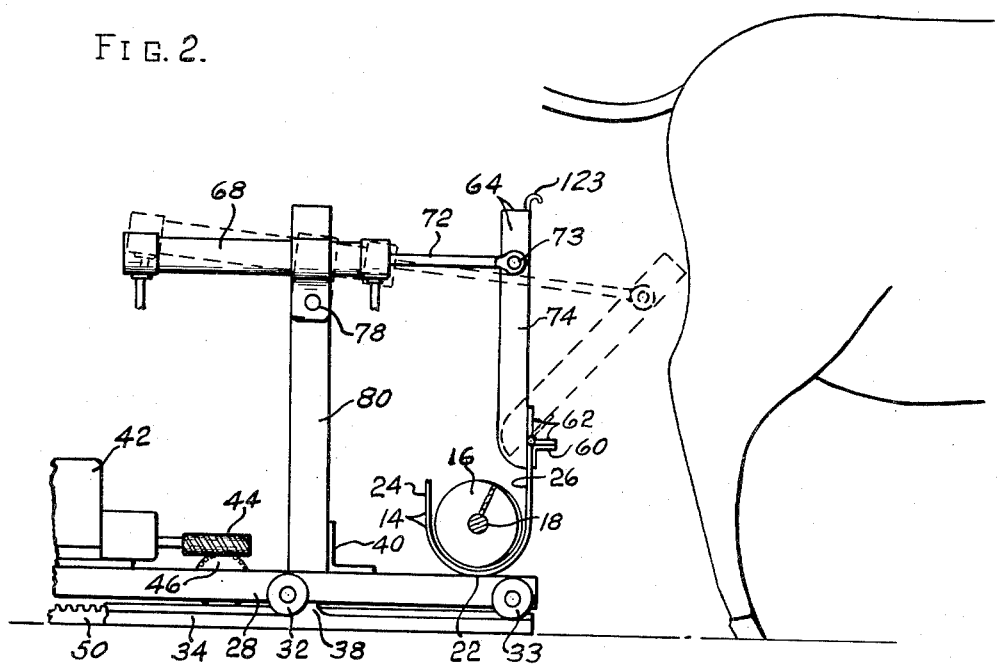

2,779,309

DAIRY STABLE SANITATION EQUIPMENT

Howard I. Myer, Fulton, N. Y., and Fred C. Myer, Punta Gorda, Fla.

Application October 12, 1954, Serial No. 461,765

7 Claims. (Cl. 119—27)

This invention relates to apparatus for the sanitary disposition of animal excretions particularly applicable to maintaining cleanliness in dairy stables.

The present invention is directed to providing apparatus to prevent excretion from cows from being deposited on the stable floor whereby the individual stalls may be maintained in sanitary condition, and the cows kept reasonably clean. The invention more particularly is directed to apparatus adapted for causing excrement to be delivered to a conveyor, such apparatus including a chute for each stall, the chute being adapted to be moved into position to effectively intercept excrement for direct delivery to the conveyor. The invention further relates to a sensing device responsive to the animal's known reflex, that of humping its back immediately prior to and during excretion, and means for moving a chute into effective relation to the animal's posterior, whereby to intercept and convey the excrement to the conveyor. The invention further has to do with providing mechanism normally located out of the range of movement of the animal in its stall when confined by its stanchion, but capable of assuming effective operative relationship when necessity is manifested by the animal's preliminary reflexes. The invention further has to do with the mounting of such apparatus in a retractable manner, whereby such apparatus may be readily moved bodily from behind a row of stalls to provide an adequate runway for the animals when being taken from their stalls to pasture or upon return.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1 is a fragmentary perspective view of the apparatus applied to two stalls of a series of stalls;

Figure 2 is an end elevation of the apparatus;

Figure 3 is an enlarged sectional view through the sensory valve and rigging taken substantially on the line 3—3 of Figure 1 with a part broken away;

Figure 4 is a diagrammatic view partly in section of the control circuit for operating the chute; and Figure 5 is a diagrammatic view of an electrically controlled valve adapted to the control circuit.

Referring to the drawings, and particularly Figures 1 and 2, there are shown two stalls 10 and 12 of a row of stalls arranged side by side, the confining structure or stanchions of which limit the movement of such animal, being not shown. Extending across the rear of the stalls is an open conveyor trough 14, which in practice will extend the entire length of the stable, behind the row of stalls. Such conveyor trough may be provided with a helical conveyor worm or screw 16, mounted on a shaft 18 journalled in an end bearing 20, which in practice may be driven from time to time by any suitable power means (not shown) to move the deposits to one end of the trough where suitable disposition thereof may be made. The trough is formed with a semi-cylindrical lower portion 22 adapted to cooperate with the screw 16, and is provided with upstanding flanges 24 and 26 of a sufficient height to contain the material to be handled.

The conveyor is mounted upon two or more transversely disposed carriage members such as 28 and 30 having rollers 32 and 33 riding in trackways 34 and 36 mounted on or formed in the stable floor, so that the conveyor and apparatus carried thereby may be retracted away from the stalls to provide an adequate runway for the cattle to leave the stalls when proceeding to or returning from pasture. The runways may be provided with a stop such as 38, located so as to engage either roller 32 or 33 to limit the extent of movement of the carriage members. The carriage members are tied together by the conveyor which may be secured thereto, in any suitable manner, and by a tie member, as in the form of an angle bar 40, extending along the length of the apparatus.

Movement of the carriage members on the trackways is effected by a reversible motor 42 mounted on the carriage member 28, such motor driving a reduction gearing such as a worm 44, and worm gear 46, the latter being keyed to a shaft 48 extending lengthwise of the apparatus, and journalled in the carriage members 28 and 30. The underside of the worm gear 46 may directly engage a rack 50 secured to the stable floor, and extending parallel to the trackway 34.

Adjacent the carriage member 30, a pinion 52 having a similar pitch diameter to the worm wheel 46 is provided, such pinion engaging a second rack 54 secured to the floor and extending parallel with the trackway 36. In practice, it will be understood that a similar rack and pinion will preferably be provided adjacent each carriage member so that positive movement of the entire apparatus will be effected in moving the apparatus from operative relationship to the stalls, or away therefrom, to provide egress or ingress in respect to the stalls. The motor 42 is suitably controlled by a conveniently located master switch and reversing switch 56 and 58 respectively.

The flange 26 of the conduit is reinforced along its upper edge by an angle member or the like 60, and pivotally attached thereto, as by hinges 62, are a series of relatively broad chutes, 64, 66, etc. one for each stall. Each chute is normally held in a vertical position, and is of a length and so mounted as to be readily swung to an inclined position, with its upper edge in engagement with the posterior of the animal present in the stall, at a point such as to intercept excretions of the animal. The chute, in practice will be of a width sufficient to span the possible lateral positioning of the animal's posterior, so as to be fully effective at all times.

In order to move the chute from the vertical position to the effective position for interception, there is provided an air cylinder and piston 68 and 70, respectively, the piston rod 72 of which is pivotally connected as at 73 to one of the side flanges 74 and 76 of the chute. Such cylinder may be of the double acting type, and is pivotally mounted as at 78 on on upright 80 extending from the angle iron tie member 40.

Above each stall, in a position over the animal's back, there is suspended a sensing bar 82, extending transversely of the stall. Each of the bars 82 are supported from a beam 84 through an intermediate control actuating bar 86, the actuating bars being supported and guided by U hangers 88 and 90. Intermediate the hangers is mounted a three-way valve 92, having a valve actuating stem 94 in engagement with the bar 86, so that upon slight upward movement of the bar 86, the valve is actuated from one position to the other. The sensing bar 82 is suspended from the valve bar 86 by flexible cords 96 and 98, which in practice may be adjustable in length, and the weight of the bars 82 and 86 are carried on springs 100 and 102 extending from the beam 84 to the bar 86, such springs being of a tension such as to permit the actuating bar to lightly rest on the hangers 88 and 90, but lift the bar 86, whenever the sensing bar 82 is raised and the weight thereof removed from the valve bar 86. When the actuating bar 86 rises, bodily or at either end, the valve 92 is actuated. The sensing bar 82 may have depending endwise straps 83 to keep the animal under the bar, it being understood that the sensing bar will be adjusted at a height so as to just clear the normal height of the animal's back, so that the end straps will touch the animal on straying to one side or the other and tend to guide the animal to take a central position. Such straps will have sufficient flexibility, however, as to avoid any lifting effect upon the bar 82, should the animal contact the same.

As shown in Figure 4, the valve 92 is provided with a compressed air inlet port 104 connected to a reservoir 106 and a compressor 108 adapted to maintain a reserve supply of compressed air at a desired pressure. The valve casing is provided at either end with ports 110 and 112 to atmosphere, and spaced ports 114 and 116 connected to the opposite ends of the cylinder 68 by conduits 118 and 120. Within the valve is a spool-like member 122 having end flanges 124 and 126 adapted to control the supply of air under pressure to ports 114 and 116. The valve member 122 is biased lightly downwardly by the spring 128, and adapted to be lifted by the valve stem 94, in engagement with the bar 86, whenever such bar rises or tilts by reason of the lifting of the sensory bar 82. When the valve member is lifted, the port 116 is connected to exhaust through port 112 and the port 114 connected to the source of pressure supply, or port 104. Under these conditions, air is admitted under pressure to the head end of the cylinder 68 and the chute is caused to be moved into inclined operative intercepting position.

The diameter of the cylinder and the air pressure, and connection to the chute is such that no undue pressure is exerted by the upper edge of the chute upon the animal's back or posterior but engagement of the chute with the animal is effected before the complete stroke of the piston so that in the event the animal moves, the chute will be caused to follow and maintain its engagement. The engagement will be sufficiently light so as to permit the animal to move or dislodge its tail, the lifting of which is a well-known habit of the animal while preparing for or undergoing the evacuation process.

When the evacuation is completed, the animal relaxes, the humping effect of its back is terminated and the valve returns to normal, with the result that the piston is returned to the head end under pressure. The chute is thus elevated to the vertical position, tending to dislodge and deliver any remaining excrement thereon into the trough for delivery to the end thereof by the screw 16.

It will be appreciated that in practice the upper edge 123 of the chutes may be rolled as shown, or be padded to avoid discomforture to the animal, and it will also be understood that the cylinder and piston diameter and pressure employed will be so correlated as to be effective to maintain contact with the animal, but not so high as to exert undue pressure upon the animal's posterior.

In Figure 5, there is shown an electrical switch mounted in a bracket 130 supported on the beam 84, such bracket containing a slidable stem 132 in engagement with the bar 86. The stem has a lower stop 134, a flange 136 and a light return spring 138. The flange 136 when lifted slightly, allows spring contact leaf 140 to engage contact leaf 142, both of which leaves are insulatedly mounted on the bracket arm 144. The contact leaves thus close a circuit to a solenoid 146 of a solenoid-actuated valve 148, the details of the latter being similar to the valve 92, and being connected to the source of pressure supply and to the cylinder in the same manner.

Although a single embodiment of the invention has been illustrated and described showing air pressure actuation and control, it is to be understood that the invention is not limited thereto. As various changes in the construction and arrangement may be made of an equivalent nature without departing from the spirit of the invention, as will be apparent to those skilled in the art, reference will be had to the appended claims for a definition of the limits of the invention.

What is claimed is:

1. A dairy stable sanitary apparatus comprising an animal waste receiver adapted to be located at the rear of a stall, a chute hinged on said receiver adapted to discharge thereinto, and to be moved from a vertical nonoperative position to an inclined position extending into a stall, means mounted on said receiver and having a connection to said chute for moving said chute from the vertical to the inclined position and vice versa, sensing means located forward of said receiver and adapted for location above said stall comprising a member adapted to be engaged by an animal's back when rising in response to an arching reflex, and means associated with said moving means and actuated by movement of said bar in response to said reflex for causing movement of said chute to the inclined position.

2. A dairy stable sanitary apparatus comprising an animal waste receiver adapted to be located at the rear of a stall, a chute hinged on said receiver adapted to discharge thereinto, and to be moved from a vertical nonoperative position to an inclined position extending into a stall, means mounted on said receiver and having a connection to said chute for moving said chute from the vertical to the inclined position and vice versa including a fluid pressure motor, sensing means located forward of said receiver and adapted for location above said stall comprising a member adapted to be engaged by an animal's back when rising in response to an arching reflex, and a control valve actuated by said member, and means connected to said valve and motor for causing movement of said chute to the inclined position upon actuation of said valve in response to said reflex.

3. A dairy stable sanitary apparatus comprising an animal waste receiver adapted to be located at the rear of a stall, a chute hinged on said receiver adapted to discharge thereinto, and to be moved from a vertical nonoperative position to an inclined position extending into a stall, power means mounted on said receiver and having a connection to said chute for moving said chute from the vertical to the inclined position and vice versa, means located forward of said receiver and adapted for location above said stall comprising a member adapted to be engaged by an animal's back when rising in response to an arching reflex, and means actuated by movement of said bar in response to said reflex for applying power to said power means for causing movement of said chute to the inclined position.

4. A dairy stable sanitary apparatus comprising an animal waste receiver adapted to extend across the rear of a plurality of stalls arranged side by side, said receiver being in the form of a trough and having conveyor means therein, a plurality of chutes, one for each stall, hinged adjacent said trough and adapted to discharge thereinto, each of said chutes being adapted to move from a vertical inoperative position to an inclined operative position extending into a stall area, individual power means mounted on said receiver and having a connection to said chute for moving each of said chutes to the inclined position, and a reflex sensory device adapted for location above each stall and having a device for controlling the actuation of the said power means for the corresponding stall, said device having means actuated by the reflex arching on an animal's back for actuating said controlling device.

5. A dairy stable sanitary apparatus comprising an animal waste receiver adapted to extend across the rear of a plurality of stalls arranged side by side, said receiver being in the form of a trough and having conveyor means therein, a plurality of chutes, one for each stall, hinged adjacent said trough and adapted to discharge thereinto, each of said chutes being adapted to move from a vertical inoperative position to an inclined operative position extending into the respective stall area, individual fluid pressure power means mounted on said receiver and having a connection to said chute for moving each of said chutes to the inclined position, and a reflex sensory device adapted for location above each stall and having a valve for controlling the actuation of the said fluid pressure means for the corresponding stall, said device having means actuated by the reflex arching of an animal's back for actuating said valve.

6. A dairy stable sanitary apparatus comprising an animal waste receiver adapted to extend across the rear of a plurality of stalls arranged side by side, said receiver being in the form of a trough and having conveyor means therein, a plurality of chutes, one for each stall, hinged adjacent said trough and adapted to discharge thereinto, each of said chutes being adapted to move from a vertical inoperative position to an inclined operative position extending into a stall area, individual power means mounted on said receiver and having a connection to said chute for moving each of said chutes to the inclined position, a reflex sensory device adapted for location above each stall and having a device for controlling the actuation of the said power means for the corresponding stall, said device having means actuated by the reflex arching of an animal's back for actuating said controlling device, and carriage means for said trough, chutes and power means adapted for movement from a position immediately behind said stalls to a point spaced therefrom, said carriage means being located beneath and extending transversely of said trough whereby to provide a runway for said stalls to permit cattle to leave and return to their respective stalls.

7. Dairy stable sanitary apparatus comprising an animal waste receiver adapted to extend across the rear of a plurality of stalls arranged side by side, said receiver being in the form of a trough and having conveyor means therein, a plurality of chutes, one for each stall, hinged adjacent said trough and adapted to discharge thereinto, each of said chutes being adapted to move from a vertical inoperative position to an inclined operative position extending into a stall area, individual power means mounted on said receiver and having a connection to said chute for moving each of said chutes to the inclined position, a reflex sensory device adapted for location above each stall and having a device for controlling the actuation of the said power means for the corresponding stall, said device having means actuated by the reflex arching of an animal's back for actuating said controlling device, carriage means including a track for movably supporting said trough, chutes and power means, said track extending transversely of said trough adapted to support said carriage means for movement of said trough from a position immediately behind said stalls to a point spaced therefrom, said carriage means being located beneath and extending transversely of said trough whereby to provide a runway for said stalls to permit cattle to leave and return to their respective stalls, and power means for driving said carriage means.

References Cited in the file of this patent

UNITED STATES PATENTS

| | | |
|---|---|---|
| 568,788 | Parker | Oct. 6, 1896 |
| 599,763 | Burnes | Mar. 1, 1898 |
| 889,735 | Onderhill | June 2, 1908 |
| 1,411,312 | Swensen | Apr. 4, 1922 |

FOREIGN PATENTS

| | | |
|---|---|---|
| 515,154 | Germany | Dec. 29, 1930 |